Sept. 2, 1952  M. E. P. STUDDERT  2,608,921
REFLEX CAMERA WITH CURTAIN SHUTTER
Filed May 17, 1948  8 Sheets-Sheet 1

Inventor
Maurice E. P. Studdert
By Emery Holcomb Blair
Attorneys

Sept. 2, 1952     M. E. P. STUDDERT     2,608,921
REFLEX CAMERA WITH CURTAIN SHUTTER
Filed May 17, 1948     8 Sheets-Sheet 4

FIG. 4.

Inventor
Maurice E. P. Studdert
By Emery, Holcombe & Blair
Attorneys

Sept. 2, 1952 M. E. P. STUDDERT 2,608,921
REFLEX CAMERA WITH CURTAIN SHUTTER
Filed May 17, 1948 8 Sheets-Sheet 5

Inventor

Maurice E.P. Studdert
By Emery Holcombe Blair
Attorneys

Sept. 2, 1952 M. E. P. STUDDERT 2,608,921
REFLEX CAMERA WITH CURTAIN SHUTTER
Filed May 17, 1948 8 Sheets-Sheet 6

Inventor
Maurice E. P. Studdert
By Emery Holcombe & Blair
Attorneys

Inventor
Maurice E. P. Studdert
By Emery Holcombe & Blair
Attorneys

Sept. 2, 1952  M. E. P. STUDDERT  2,608,921
REFLEX CAMERA WITH CURTAIN SHUTTER
Filed May 17, 1948  8 Sheets-Sheet 8

Inventor
Maurice E. P. Studdert
By Emery Holcombe & Blair
Attorneys

Patented Sept. 2, 1952

2,608,921

UNITED STATES PATENT OFFICE 2,608,921

REFLEX CAMERA WITH CURTAIN SHUTTER

Maurice Eyre Persse Studdert, Waterford, Eire; Helena Ruth Katie Studdert, executrix of said Maurice Eyre Persse Studdert, deceased, assignor to Wray (Cameras) Limited, Bromley, England, a British company Application May 17, 1948, Serial No. 27,536
In Great Britain May 21, 1947

11 Claims. (Cl. 95—42)

This invention relates to photographic cameras and, in particular, to miniature cameras such as those in which 35 mm. or cinematograph film is used and one of its main objects is to provide a form of camera construction such that a miniature camera can be built as a practical reflex camera for direct focussing thereby eliminating the need of range-finder mechanism while enabling the camera to be of dimensions near to the recognised size of a miniature camera. At the same time, the invention provides a camera of the above type which can be fully automatic so that upon a single winding, it is only necessary to set the shutter speeds and operate a release when a number of pictures can be taken without further preparation; the selection of exposure is a very simple operation and focussing can be carried out at eye level with an image apparently of natural size and all this in a camera embodying a much smaller number of parts than has been found possible previously in a camera of the grade in question.

In order to make the above results possible, according to the invention, an optical system is employed in which a prism has one face ground to serve as a focussing screen for the image formed by light entering the camera lens and reflected by a mirror and other faces of the prism reflect the light from the image which leaves at the rear and enters a magnifying eyepiece. Thus, one face of the prism serves as the focussing screen, two other faces for reflection and the light finally leaves the face at the rear so that a four-sided prism could be used. However, as the prism is housed in a well in the camera body and, in such a type of camera, saving of space is a dominant factor, a pentagonal prism is preferred to be employed. A photo-electric cell is used to determine the intensity of light entering the camera lens and, in order to avoid detracting from the brightness of the picture, light scattered from the focussed image is utilised for activating the photo-electric cell. It is preferred to apply the latter direct to one of the end faces of the prism. The cell is connected to an electric meter arranged for the pointer attached to its moving system to be set to a predetermined position seen in the eyepiece, by adjustment of the member for selecting the shutter speed. The electric meter employed is conveniently adjusted by turning its field magnet about the axis of its moving system.

The mirror is arranged to be controlled by the operation of the exposure release member and when released may conveniently move upwards on a guide out of the shutter space and then initiates the operation of the camera shutter for making an exposure. This movement of the mirror may be effected by a spring which is restressed when the mirror is returned at the end of an exposure. This return movement is effected by power provided by a hand-wound main spring which may also be arranged to feed the film for a number of exposures without rewinding.

The shutter arrangements comprise two blinds or equivalent plates and cords which are released so as to move in succession at a time interval determined by the shutter-speed setting member. The operation of the two blinds is preferably effected by a pair of spring-actuated take-up rollers, the springs of which are also rewound and the blinds returned after an exposure by power provided by the main spring. The shutters are normally held by detents and pivoted levers which are released in succession by a pair of pins or similar projections and to enable the projections to operate with an adjustable time interval, they may be connected by a slipping clutch which allows one to be adjusted relatively to the other but causes them to be rotated together when they are freed; they are preferably driven by a further spring also rewound after an exposure by power derived from the main hand-wound spring. In order to control the slower speeds of the shutter, the pair of projections is connected by gearing to a centrifugal governor or brake which thus limits the speed at which the spring can rotate those projections.

It is necessary to make provision for relating the shutter speed to the sensitivity of the film in use since other variables such as the aperture used in the camera lens and any filters employed are compensated for by the nature of the exposure meter system. For this purpose, the coupling between the adjustable part of the electric meter and the shutter setting member is made to include an adjustable element which can be adjusted by a manual control graduated in terms of film speeds.

Other components may be fitted including means for automatically igniting flash bulbs or controlling electronic flashes at predetermined times before the commencement of an exposure. For that purpose, one or more pairs of contacts may be provided, arranged to be actuated upon movement of the shutter blinds and connected to terminals on the camera body for connection of leads to an electrically-ignited flash bulb or an electronic flash.

In order that the invention may be more fully explained, an example of a miniature camera for a 35 mm. film or standard cinematograph film will now be described with reference to the accompanying drawings, in which.

The camera illustrated has a conventional type of body 1 as is familiar to users of miniature cameras. The camera is arranged to be operated by a main spring 2, which provides the power for operating the roller blind shutters and the film feed after each exposure and for returning the mirror, and is designed so that one winding of the spring 2 suffices for the operations corresponding to a number of exposures, for example, twelve, in the embodiment illustrated.

The camera is a reflex camera with a mirror 3 arranged to slide upwards out of the shutter space on a guiding pillar 4.

The optical system will be described more fully later but it may be mentioned that the light received through the lens 5 is reflected by the mirror 3 on to the upper surface 6 of a pentagonal prism 7 which is ground and, in effect, serves as the focussing screen; the image is reflected successively from the faces 8, 9 of the prism 7 and normally can be viewed in a magnifying eyepiece 10 at the back of the camera through an aperture 11 in the inner or front blind 12 of a pair of shutter blinds. The magnifier may have a magnification of 5 to 1 which has the effect that with a camera lens of 5 cms. focal length, the image on the focussing screen appears to be of natural size. Thus focussing is normally effected with the camera at eye level.

The mirror is released by depressing an exposure button 13 and the rising of the mirror initiates the subsequent stages of operation.

Figure 10:
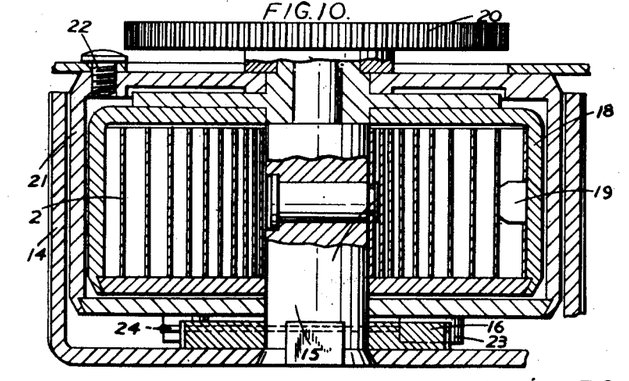
Figure 10 is an axial section on the line X—X in Figure 2, showing the main driving spring.

After this preliminary explanation, the different parts will now be described in detail. The spring 2 is wound up by rotating the hollow knurled knob 14 in which the spring 2 and its housing are lodged. The knob 14 is fixed to the central axle 15 and on the inside of the lower wall of the knob 14 is secured a ratchet wheel 16. All these parts are located at the bottom on the left of the camera as viewed from the front, as can be seen from Figure 2. The spring 2 is secured to the axle 15 by a rivet 17 (Figure 10) at its inner end and at its outer end, is rivetted to an inner housing 18 by a rivet 19. The housing 18 is free to be turned on the axle 15 and carries a spur wheel 20. The spring has an outer housing 21 fixed to the camera body as at 22 and carries a pawl 23 held by a spring 24 in engagement with the ratchet wheel 16; this pawl and ratchet connection prevents the knob 14 from running back when the spring 2 is wound. Winding of the spring enables it to supply the power for carrying out the operations associated with twelve exposures.

The mirror 3 and its carriage, when released, move up along the guide pillar 4 as already stated but it is possible to mount the mirror 3 pivotally on the bracket 25 (Figure 4) so that it is held by a spring against a stop in the operative position shown, but on rising clear of the shutter space, its front edge at 26 may engage a fixed pin, not shown, and cause the mirror 3 to be turned downwards so as to save headroom. In that event, the spring would return the mirror to the working angular position when it is again lowered.

Figure 4:
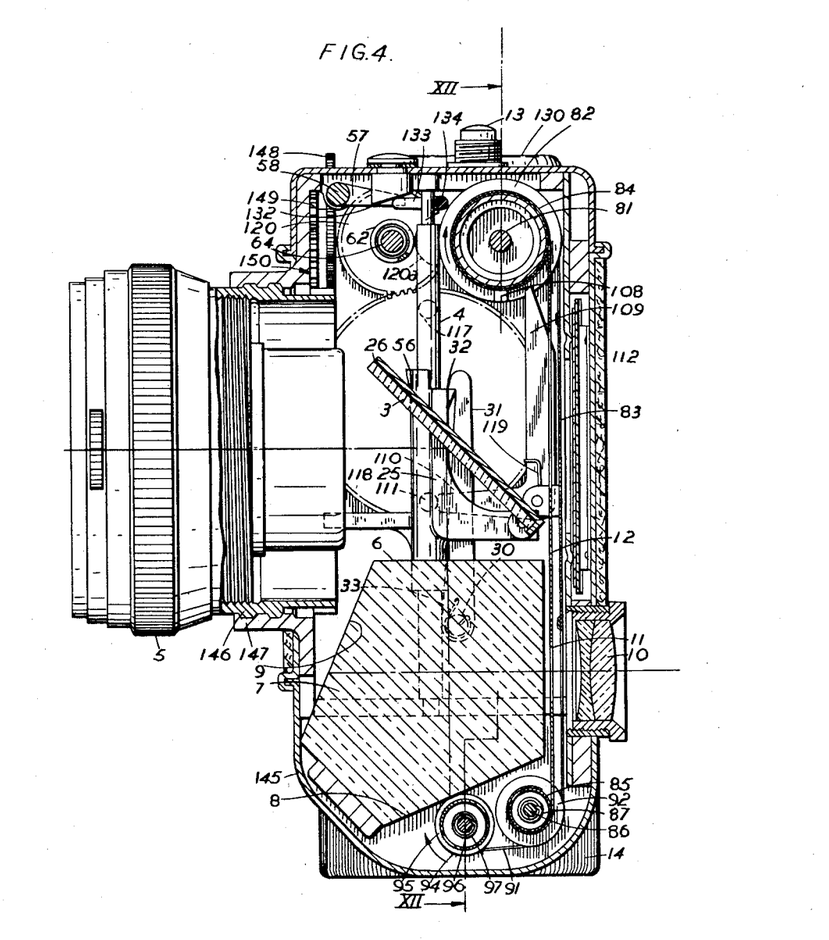
Figure 4 is a transverse section taken on the line IV—IV in Figure 2.
Figure 6:
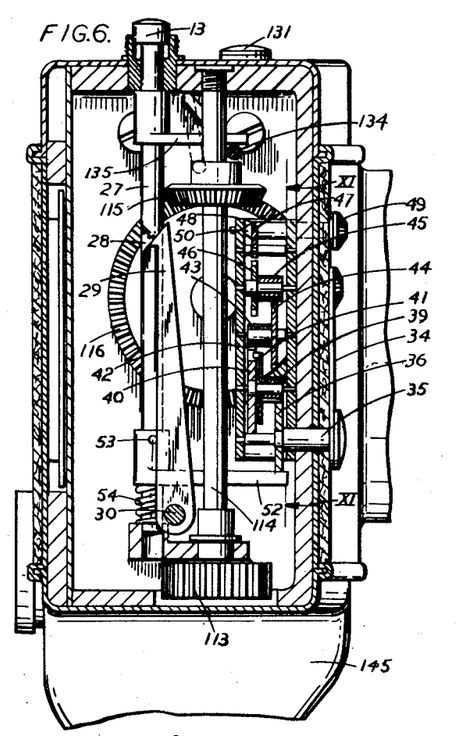
Figure 6 is yet another similar section taken on the line VI—VI in Figure 2.

The mirror carriage 25 can be released either by pressing the release button 13 or by automatic delay mechanism. In the former event, on pressing in the exposure button 13, its stem 27 moves down and a projection 28 thereon engages the hooked end of a lever 29 which it rocks clockwise, as seen in Figure 6. The lever 29 is fixed to a spindle 30 to which also another lever 31 is secured on the other side of the camera, as seen in Figure 4. By this movement the lever 31 releases the mirror carriage at the point 32. As soon as the projection 28 has passed the hooked end of the lever 29, the levers 29 and 31 are swung back by a wire spring 33 to their original position where they remain on releasing the button 13, since the lever 29 is springy and can yield in a plane at right angles to the drawing in Figure 6, and the projection 28 is of such a shape as to cause the lever 29 so to yield that the projection, in moving upwards, can pass it.

Figures 5, 11:
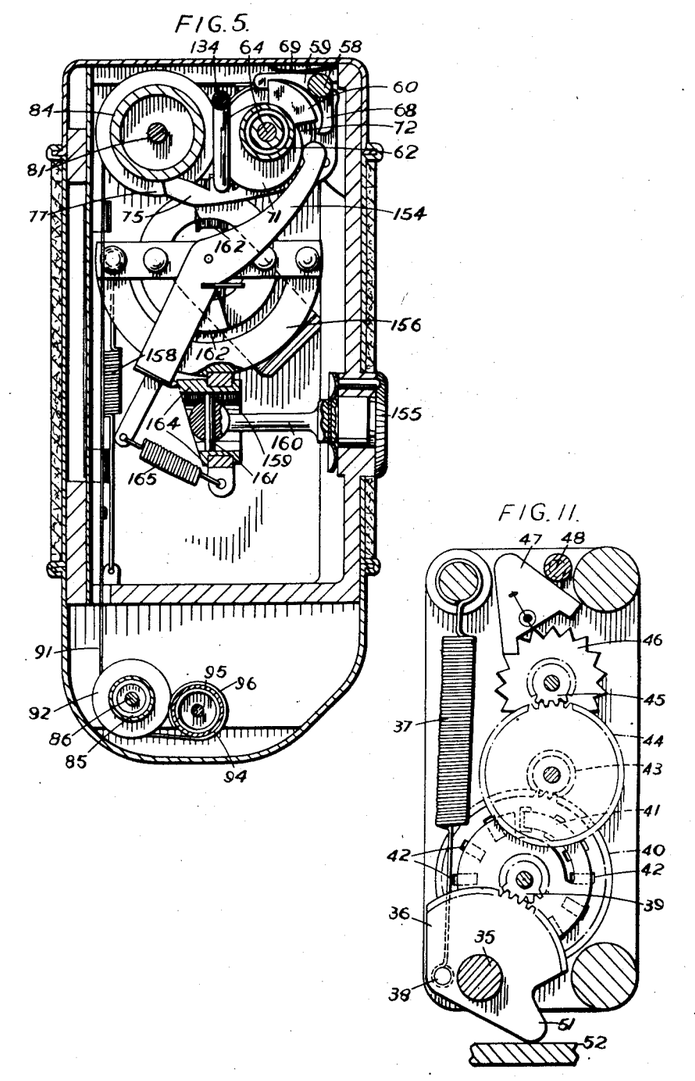
Figure 5 is a similar transverse section taken on the line V—V in Figure 2.
Figure 11 is a detailed elevation of the mechanism for providing delayed exposures, taken in section on the line XI—XI in Figure 6.

The mirror carriage can also be released by means of the automatic mechanism for delayed exposure seen in Figure 6 and shown in detail in Figure 11. On rotating the setting lever 34 fixed to a spindle 35, in the counterclockwise direction, as seen in Figure 11, the toothed segment 36 is turned and tensions the spring 37 anchored to it at 38; at the same time, the segment 36 drives a pinion 39 which is connected to a spur wheel 40 through a one way slipping clutch comprising a spring arm 41, the end of which is shaped to engage a ring of slots 42 in the spur wheel 40. The arm 41 can yield under a certain driving force and jump from one slot 42 to the next. The spur wheel 40 drives a pinion 43 fixed to a further spur wheel 44, which, in turn, drives another pinion 45 fixed to an escapement wheel 46. This last wheel is engaged by a pivotally mounted escapement 47 and during the tensioning of the spring 37 by turning the lever 34, the escapement is locked by a pin 48 with the clutch 41, 42 slipping. The pin 48, as seen in Figure 6, can be retracted by a knob 49 and is tapered at 50 so then it frees the escapement 47 and releases the mechanism; the spring 37 then recovers and turns the segment 36 clockwise, in Figure 11, so that a tail 51 of the segment 36 pushes down a foot 52 fixed by a pin 53 to the stem 27 of the exposure button 13 (Figure 6). The latter is, therefore, drawn slowly downwards and releases the mirror carriage 25 after fifteen seconds, in the manner already described. The release button 13, it will be noted, cannot be operated unless the spring 37 is tensioned, which is the normal condition of the mechanism. The return spring for the button 13 is shown at 54 in Figure 6.

When the mirror carriage 25 has been released by either of the means described above, it is driven upwards on the guide pillar 4 by the coiled compression spring 55 (Figure 2) encircling the bottom of that pillar so that a projection 56 at the top of the carriage 25 comes into contact with a lever 57 (Figure 4) fixed to a spindle 58 and thereby lifts that lever as soon as the mirror 3 has risen clear of the shutter space. At the other end of the spindle 58, a detent 59 is fixed (Figure 5) so that detent is lifted clear of a projection 60 which extends from a disc 61 (Figure 3) which will be referred to below. The shutter timing mechanism is driven by a coiled torsion spring 62 anchored at one end at 63 to a fixed spindle 64 and at the other end to a sleeve 65 which can be turned on the spindle 64. The disc 61 is part of an outer sleeve which is keyed to the sleeve 65 at 66 so that when the detent 59 releases the projection 60, the spring 62 which is rewound at the completion of each exposure, can rotate the disc 61 and with it a shutter releasing pin 67 which extends from the disc 61. After rotating counterclockwise as seen in Figure 5 through an angle of about 270 degrees, the projection 60 engages the tail end 68 of the detent 59 and is held there until the detent 59 is rocked by a flat spring 69 when the mirror carriage finally descends to its initial position and releases the lever 57; the tail 68 then releases the projection 60 which moves on to its original position engaging the detent 59, as shown in Figure 5. There is a second shutter releasing pin 70 which projects inwardly from a cam 71 (Figure 3). This cam is part of a sleeve integral with a bevel wheel 72 and mounted so that it can turn on the sleeve 65 but is normally prevented from doing so by a slipping clutch 73 through which it is connected to the disc 61 and pin 67.

Figure 7:
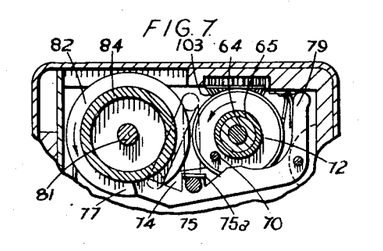
Figure 7 is a section of a detail taken on the line VII—VII in Figure 2.
Figure 8:
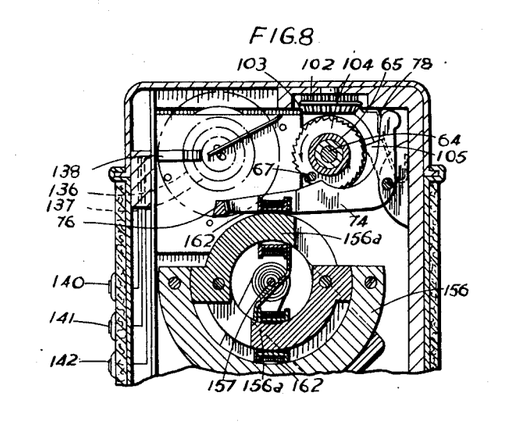
Figure 8 is a similar section taken on the line VIII—VIII in Figure 2.

During the first 270 degrees of rotation of the shutter releasing pins 67 and 70, they respectively act on levers 74 and 75 (Figures 7 and 8). The tips of these levers engage projections 76 and 77 in order to hold the two shutter blinds in the starting or closed position; thus the pins 67 and 70 release the projections 76 and 77 and levers 74 and 75, when the pins 67 and 70 pass them, are returned to the positions shown in Figures 7 and 8 by flat springs 78 and 79. It can be seen from Figure 12 that the projection 76 extends from a pulley wheel 80 which is secured to a spindle 81 having a similar pulley wheel 82 at its other end. The pulleys 80 and 82 are in effect the roller of the outer or rear blind 83 (see Figures 4 and 12). The inner or front blind, 12 on the other hand, is wound around an upper roller 84 which is loosely mounted on the spindle 81 between pulleys 80 and 82, and the projection 77 extends from one of the end flanges of that roller so that the levers 74, 75 hold the two blinds in their starting or uppermost positions. The front blind 12 at its lower end is wrapped around a lower roller 85 which can turn freely on a fixed spindle 86 but is connected to that spindle by a torsion spring 87 fixed at its inner end 88 to the spindle 86 and at its outer end to a flange 89 of the roller 85. The initial tension of the spring 87 can be set during manufacture by an adjusting lever 90 by which the spindle 86 can be slightly turned, and the lever then held in place by suitable means (not shown).

Figure 12:
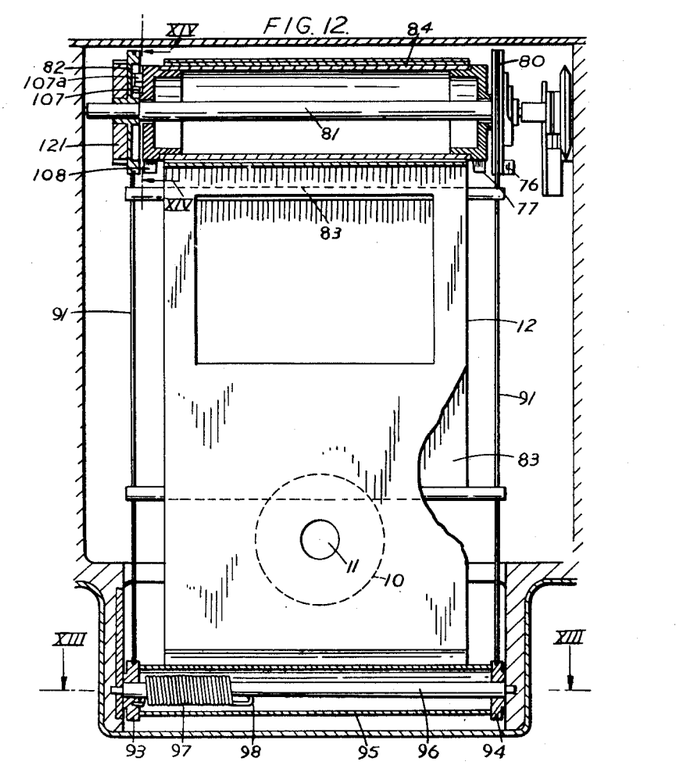
Figure 12 is a front elevation in section taken on the line XII—XII in Figure 4.
Figure 13:
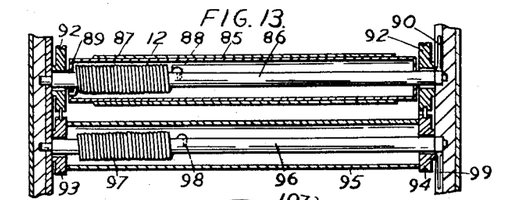
Figure 13 is a cross-section taken along the line XIII—XIII of the lower part of Figure 12.
Figure 14:
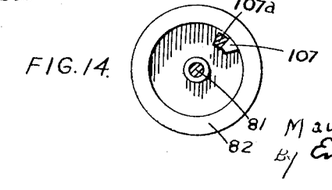
Figure 14 is a detailed transverse section on the line XIV—XIV in Figure 12.

The rear blind, however, is attached to a pair of cords 91 which are wound on the pulleys 80 and 82. However, outside the roller 85 there are a pair of pulley wheels 92, which are free of the roller 85 and free to turn loose on the spindle 86. The cords 91 of the rear blind 83 pass around these pulley wheels 92 as seen in Figures 4 and 5 and are attached to the end flanges 93, 94 of another bottom roller 95 mounted to turn on another fixed spindle 96. In this case also inside the roller there is a spring 97 fixed at one end to the spindle 96 at 98 and at the other end to the flange 93 and a lever 99 is also provided to turn the spindle 96 and adjust the initial tension of the spring 97 during manufacture similar to the adjustment of the spring 87. As will be seen later, at the end of an exposure, the springs 87 and 97 are rewound, placing tension upon the blinds 12 and 83 in readiness to draw them down when they are released by the levers 74 and 75 as described above. In Figure 12, the blinds are shown in the closed position and the image can be seen on the ground face 6 of the prism 7 through the aperture 11 in the front blind 12 in that position.

Figure 1:
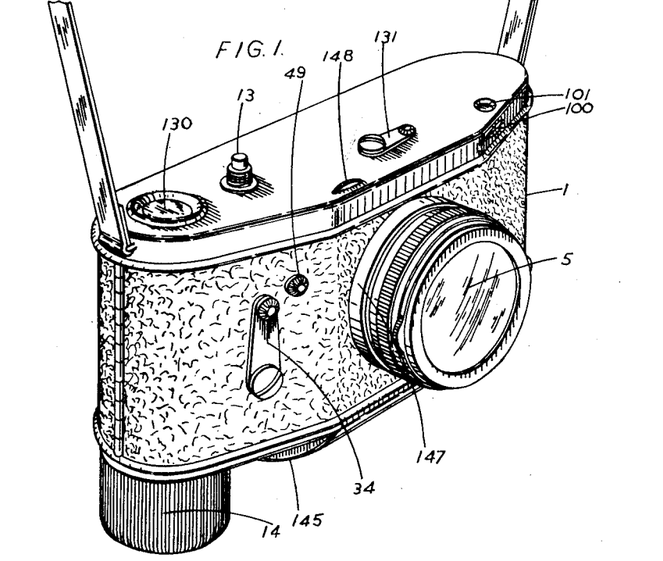
Figure 1 is a perspective view of the complete camera.
Figure 2:
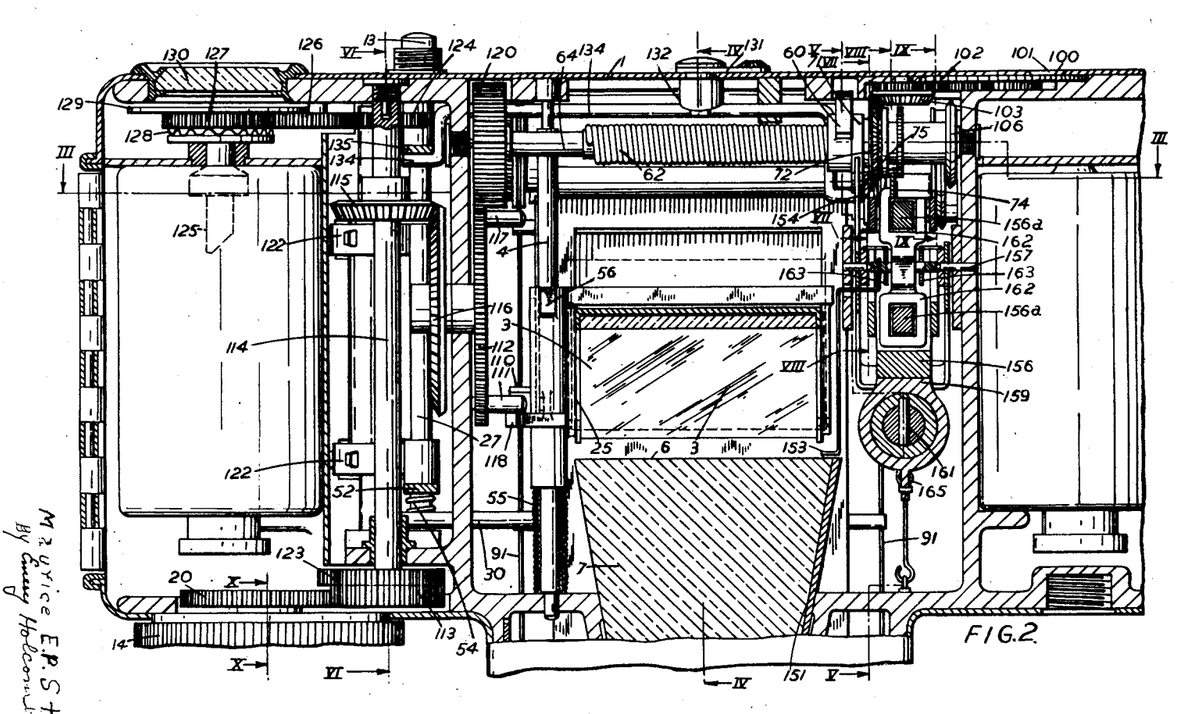
Figure 2 is an elevation from the front taken in section through the axes of the film spools.
Figure 3:
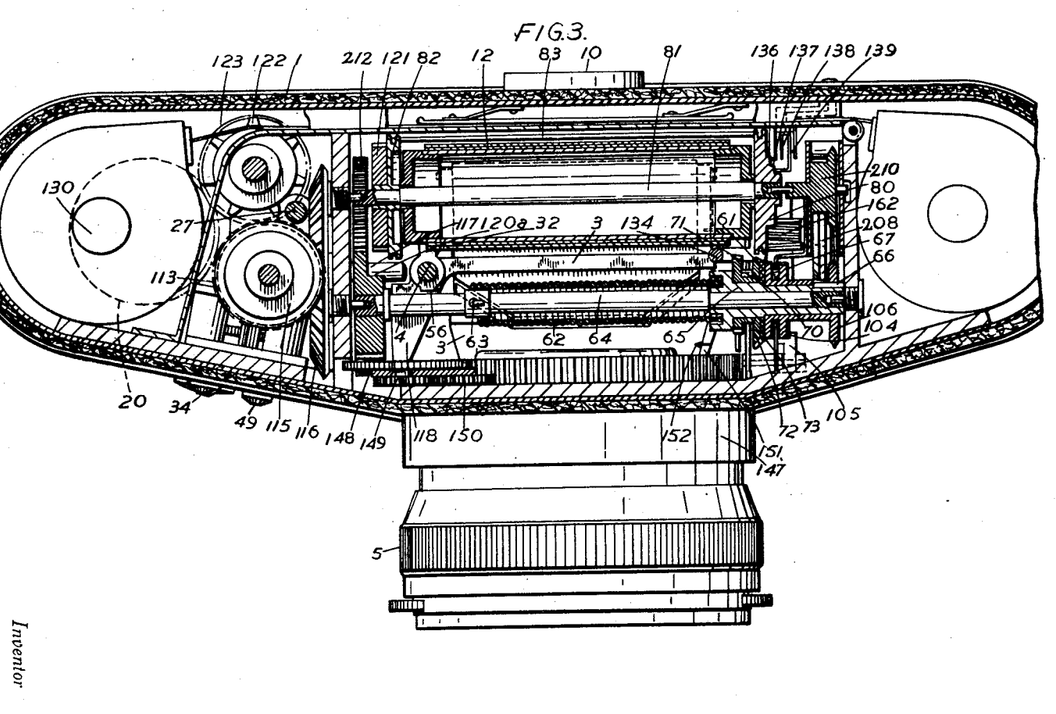
Figure 3 is a sectional plan on the line III—III in Figure 2.

The timing of the shutter depends upon the angular setting of the pins 67 and 70 and for setting the pin 70, the bevel wheel 72 which turns with it is adjusted by a setting wheel 100 at the top of the camera, the setting of which can be observed through a transparent window 101 (Figure 2). The wheel 100 drives through spur gearing 102, a bevel wheel 103 which engages with the bevel wheel 72 and the ratio of this gearing is such that in one complete revolution of the bevel wheel 72, the wheel 100 makes an exact number of revolutions so that, as will be explained later, when the shutters have been operated, the wheel 100 returns to its original setting. As already explained, the rotation of the bevel wheel 72 turns the pin 70 relatively to the pin 67 with the clutch 73 slipping but those pins are driven together when the projection 60 is released in the way already described, and then of course, the bevel wheel 72 turns with them turning the indicating wheel 100 through a number of complete revolutions. During the operation of setting the pin 70, the pin 67 is prevented from backward rotation due to the friction clutch 73 by means of a ratchet wheel 104 and pawl 105 (Figure 8).

Figure 9:
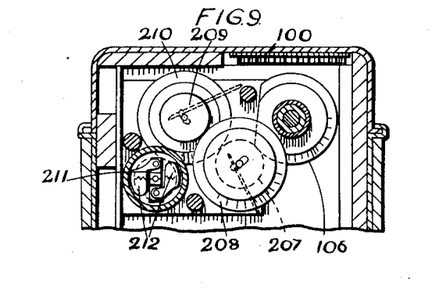
Figure 9 is a localised section taken on the line IX—IX in Figure 2.

The rate of rotation of the pin 67 and projection 60 is controlled by a mechanism of the gramophone governor type. A friction wheel 106 is rigidly connected with the pin 67 and projection 60 (see Figure 2) and drives the mechanism, best shown in Figure 9. This friction wheel 106 drives a pinion 207 fixed to another friction wheel 208 which drives a pinion 209. This last wheel is fixed to a wheel 210 which drives the centrifugal governor 211 provided with weights 212 which fly out and apply a brake if the speed is too high.

On release of the shutter projections 76 and 77, the blinds 12 and 83 are drawn down as already mentioned, the pin 67 first engages the lever 74 and releases the projection 76 so that the front blind 12 first descends and during the first portion of the downward travel before the film opening is uncovered, the aperture to the eyepiece 10 is cut off to prevent the entry of light into the space in front of the film. In this way, the acceleration period of the shutter movement is used for that purpose. When the front blind 12 is started, the other projection 77 is released at a time depending upon the setting of the pins 67 and 70 so that the rear blind 83 moves down and, at its lower edge, cuts off the exposure to the film.

On the upper blind pulley 82 there is a projecting stud 107 which has two purposes; first, to act as a limiting stop for the front blind 12 on the roller 84 and secondly, to carry that roller 84 with it through a co-operating projection 107a on the end flange of the roller 84 during the rewinding process.

The roller 84 has a further projection 108 which just before the blinds 12, 83 are moved fully down cooperates with a lever 109; the tip 110 of the lever 109 releases a pin 111 extending from a wheel 112 (Figures 2 and 4). The wheel 112 is driven from the main spring 2 through the spur wheel 20, spur wheel 113, vertical shaft 114, and bevel wheels 115, 116, the latter being on the same shaft as the wheel 112. Thus, the wheel 112 is free to revolve and a second pin 117, 180 degrees from the pin 111, drives the mirror carriage 25 downwards by pressing on a plate 118 until the catch 32 engages with the hook of the lever 31. The pin 117 goes on moving until it is stopped by the tip 110 of the lever 109 which has been returned by a spring 119 as soon as the projection 108 has passed the lever 109, in which position plate 118 is able to pass upwards past pin 117.

The spur wheel 112 drives a spur wheel 120 fixed to the spindle 64 having a cutaway portion 120a subtending an angle of 60 degrees and which in turn, engages a wheel 121 fixed to the shaft 81 of the roller 84. On the release of the wheel 112 as described above, the wheel 120 which has half as many teeth as the spur wheel 112 is thus driven from the main spring 2 through one complete revolution winding up the spring 62 of the shutter release gear and driving the wheel 121 in such a way as to wind the blinds up again to their original position. When the blinds have been wound back in this way and the levers 74, 75 have engaged the projections 76, 77 the cut-away in the wheel 120 seen at 120a is reached, leaving the spurwheel 121 free to revolve when an exposure is made, and in this position, the tip 110 of the lever 109 stops the wheel 112.

The film feeding sprockets 122 have on their spindle a spur wheel 123 which engages with the wheel 113 driven from the spring 2 through the wheel 6. A wheel 124 on the spindle of the sprockets 122, drives the normal take-up spool, as used in 35 mm. cameras, through a fork 125 which is driven from the wheel 124 through intermediate wheels 126 and 127 and a slipping clutch 128 (Figure 2). This wheel 127 is driven at a greater rate than the corresponding feed of the sprocket 122, so that the clutch 128 allows for the variation in feed per turn necessary to keep tension on the film, both when the take-up spool is empty and nearly full. The wheel 127 is geared at such a ratio that a dial 129 on its upper surface is rotated by one division more than a complete revolution at each exposure and is graduated so as to move forward therefore by one division at each operation and thus shows the number of exposures made against an adjustable mark on a transparent window disc 130 in the top of the camera.

In order to enable bulb or brief exposures to be made by keeping the button 13 depressed, a lever 131 is mounted in the top of the camera with its hub formed as a cam 132 (Figures 2 and 4); when the lever 131 is rotated through 180 degrees, the cam 132 acts on a lever 133 and thereby depresses a stirrup bar 134 (Figure 2). The right-hand end of the stirrup bar, as seen in Figure 2, is thus moved into the neighbourhood of a projecting plate 75a on the lever 75 which engages the projection 77 controlling the rear or outer shutter blind 83. On pressing the release button 13, a bracket 135 fixed to the stem 27 engages the left-hand end of the stirrup bar 134, as seen in Figure 2, to cause the other end of the stirrup bar to pass under the plate 75a, and thus to prevent the lever 75 releasing the projection 77, so that while further depressing of the button 13 will release the front blind 12, it prevents the outer or rear blind 83 from being released until the button 13 is allowed to rise and the stirrup bar 134 frees the projection 77, whereupon the blind 83 then moves down to close the shutter.

Provision is made for igniting flash bulbs automatically at predetermined times. Two cams 136 and 137 on the shutter pulley 80 (Figure 3) are arranged to close two pairs of electrical contacts 138, 139 at the correct time intervals before the shutter is opened. By this means, two alternative time intervals of approximately eight and eighteen milliseconds to suit standard flash bulbs, are provided for, merely by plugging in the leads to the bulb into the sockets 140 and 141 or 141 and 142 in the camera body, as shown in Figure 8.

Figure 15:
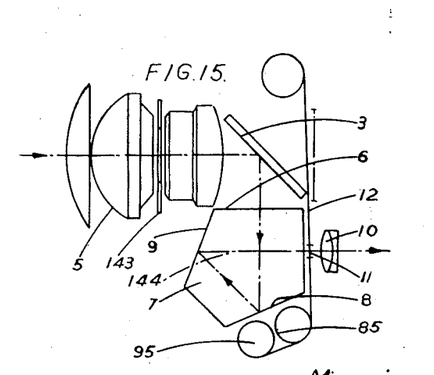
Figure 15 is a diagram of the optical system of the camera.

The optical system has already been referred to but is shown diagrammatically in Figure 15 where the same reference numerals are employed as above. The camera lens 5 is a large aperture lens, for example, of five centimeter focal length and the light passing through it and the diaphragm 143 is reflected by the mirror 3 on to the top ground glass face 6 of the prism 7, the course of the ray 144 being shown to the eye piece 10. It will be realised that the prism 7 is housed in a small well 145 of the camera body which does not add appreciably to the bulk. The lens 5 is focussed by a quick start screw thread 146 engaging an internal thread in the camera body fitting 147 and operated from a small knurled wheel 148 (Figure 4) in the camera cover, through spur wheels 149, 150.

The shutter speed is set in dependance upon the light by using a photo-electric exposure meter which is sensitive to the light passing through the main lens 5 so that the particular aperture employed and any filter employed in conjunction with the lens 5 are automatically allowed for. The photo-electric cell 151 is applied to one side of the prism 7; this photo-electric cell receives diffused light passing through the ground glass face 6 of the prism and which is obviously proportional to the total light passing through the lens 5 and this method does not detract from the brightness of the image on the ground glass screen since only waste light is used. No corrections have to be made so long as the colour sensitivity of the cell is similar to that of the film in use, except of course for films with emulsions of different speeds. A fixed mark 152 (Figure 3) is provided on the edge of the ground glass face 6 of the prism 7 so that the pointer 153 of an electrical meter connected to the cell 151 moves over it. The pointer 153 and mark 152 appear on the side edge of the picture as seen in the eyepiece 10.

The cam 71 which rotates with the pin 70 is engaged by the upper end of a lever 154 (Figure 5) and the shutter speed is set by rotating the cam 71 by the disc 100 until the pointer 153 is brought into coincidence with the mark 152 and the shutter speed is then correctly set.

In order to adjust the exposure meter to suit films of different sensitivity a dial 155, operating as will be described below, is provided (Figure 5).

An electrical meter is used in which the zero position is set by rotating the field structure. Thus, a permanent magnet 156 with pole-pieces 156a is mounted to turn on a pivot 157 attached to the camera body and the magnet is turned about the axis of the pivot by the cam 71 through the lever 154 which is also pivoted at 157. The effect of turning the dial 155 to suit different film speeds is to rotate a ring-shaped cam 164, the edge of which engages the lever 154, and as the lever 154 is held in contact with the cam 71 by a spring 158, the rotation of the dial 155 slightly rotates the permanent magnet 156 and sets its initial position relatively to the lever 154. This happens because the cam 164 is connected to the magnet 156 by a piece 159 and the spindle 160 of the dial 155 has a pin 161 which can turn the cam 164 about the axis of the spindle 160 but the pin 161 engages in grooves in the inside of the cam 164 so that the latter can move with respect to the pin 161 along the axis of the stem 160.

It has already been mentioned that during the operation of the shutter, the cam 71 is turned through one revolution and this would tend to kick the magnet 156 around. However, the end of the lever 154 is connected to the cam 164 by a spring 165, the stiffness of which is such in relation to the inertia of the magnet 156 that when this kick occurs, the spring 165 stretches without substantially moving the magnet 156.

The instrument has a double moving coil armature 162 carried from the fixed attachment so as to be deflected against the torsion of coil springs 163 which also serve to carry the current to and from the coils 162.

I claim:

1. In a photographic film camera, shutter mechanism comprising, in combination, a first shutter blind, a cooperating second shutter blind, individual driving springs for actuating said respective shutter blinds during an exposure, means to stress said driving springs and to set said blinds prior to an exposure, first and second retaining means for holding said respective driving springs in the stressed condition, a spring motor, means for stressing said motor before each exposure, means to retain said motor in the stressed condition, exposure-initiating mechanism operatively connected to disengage said retaining means for said motor to release said motor, an actuator for disengaging said first retaining means and releasing said first blind and in direct driving connection with said spring motor, a second actuator for disengaging said second retaining means to release said second blind, an adjustable driving connection between said second actuating means and said spring motor permitting of variable timed relationship between the disengagement of said two retaining means, and a manually operated member for adjusting said driving connection for different exposure settings.

2. In a photographic film camera, a shutter mechanism comprising in combination a first shutter blind, a cooperating second shutter blind, individual driving springs for actuating said respective shutter blinds during an exposure, means to stress said driving springs and set said blinds prior to an exposure, first and second detents for holding said driving springs in stressed condition, a spring motor, means for stressing said spring motor before each exposure, a member directly driven by said motor, a catch engageable with said driven member to hold said spring motor in stressed condition, exposure initiating mechanism connected to said catch to disengage said catch from said driven member, first cam means connected directly to said driven member to disengage said first detent, second cam means for disengaging said second detent, a slipping clutch between said first cam means and said second cam means, means to adjust said second cam means in relation to said first cam means, and means to prevent reverse rotation of said first cam means and said driven member.

3. In a photographic film camera, a shutter mechansim comprising in combination a first shutter blind, a cooperating second shutter blind, individual driving springs for actuating said respective shutter blinds during an exposure, means to stress said driving springs and set said blinds prior to an exposure, first and second detents for holding said driving springs in stressed condition, a spring motor, means for stressing said spring motor before each exposure, a driven member rotatable by said spring motor, a catch engageable with said driven member to hold said spring motor in stressed condition, exposure-initiating mechanism connected to said catch to disengage said catch from said driven member, first cam means connected directly to said driven member to disengage said first detent, second cam means for disengaging said second detent, a slipping clutch between said first cam means and said second cam means, means to adjust said second cam means in relation to said first cam means, means to prevent reverse rotation of said first cam means and said driven member, and means to arrest said driven member after one revolution, one revolution of said driven member and said first and second cam means being sufficient to disengage both said first and said second detent.

4. In a photographic film camera, a shutter mechanism comprising in combination a first shutter blind, a cooperating second shutter blind, individual driving springs for actuating said respective shutter blinds during an exposure, means to stress said driving springs and set said blinds prior to an exposure, first and second detents for holding said driving springs in stressed condition, a spring motor, means for stressing said spring motor before each exposure, a member directly driven by said motor, a catch engageable with said driven member to hold said spring motor in stressed condition, exposure-initiating mechanism connected to said catch to disengage said catch from said driven member, first cam means connected directly to said driven member to disengage said first detent, second cam means for disengaging said second detent, a slipping clutch between said first cam means and said second cam means, means to adjust said second cam means in relation to first cam means, and means to hold said driven member and said first cam means stationary during the stressing of said spring motor, said means for stressing said spring motor being operatively connected to the opposite end of said spring motor to said driven member.

5. In a photographic film camera, a shutter according to claim 2, further comprising bulb exposure means operative upon actuating said exposure initiating mechanism, to arrest said spring motor after the disengagement of said first detent and before the disengagement of said second detent, and means to retain said bulb exposure means in inoperative condition.

6. A photographic reflex camera comprising in combination cooperating first and second shutter blinds, individual driving springs for said first and second blinds, means to stress said driving springs, means to hold said springs stressed prior to an exposure, a reflex mirror mounted for movement between viewing and exposure positions, means to move said mirror into the exposure position, means to retain said mirror in the viewing position, manually operable means to release said mirror, a spring motor, means to stress said spring motor before an exposure, means to retain said motor in stressed condition, means operated by said mirror upon movement of the latter into the exposure position to disengage said retaining means to release said motor, a first timing member in driving connection with said motor to effect the release of said first blind, a second timing member in adjustable driving connection with said motor to effect the release of said second blind, and means to adjust the relationship between said first and second timing members.

7. A photographic camera comprising in combination first and second cooperating shutter blinds, individual driving springs to actuate said blinds during an exposure, first and second retaining means to retain said shutters set and said springs stressed prior to an exposure, a spring motor, a first timing member in permanent driving connection with said spring motor to disengage said first retaining means, a second timing member in adjustable connection with said motor to disengage said second retaining means, a main power spring, means to stress said main power spring, means to hold said main power spring in stressed condition, means driven by said main power spring to reset said blinds and restress said spring motor and said driving springs after an exposure, means operated by said second blind to release said main power spring after an exposure, and means to arrest said main power spring when said spring motor and said driving springs are fully wound.

8. A photographic camera according to claim 7, further comprising means to disconnect said blinds from said main power spring when said blinds are reset.

9. A photographic film camera according to claim 7, further comprising means to advance said film, and a driving connection between said power spring and said film advancing means such that said film is advanced when said main power spring is released after an exposure.

10. A reflex photographic camera according to claim 7, further comprising a reflux mirror mounted for movement between the viewing and exposure position, spring means to move said mirror into the exposure position and means driven by said main power spring to restress said spring means and restore said reflex mirror to the viewing position after an exposure.

11. A photographic camera comprising in combination first and second shutter blinds, individual spring loaded pulleys to actuate said blinds during an exposure, let off pulleys to set said blinds and stress said springs prior to an exposure, first and second detents engageable with said let off pulleys to retain said blinds in set condition, a spring motor, a first cam member permanently connected to said spring motor to disengage said first detent, a second cam member to disengage said second detent, a slipping clutch between said first and second cam members, means to set said second cam member relative to said first cam member, a hand wound main power spring, gearing connecting said power spring to one of said let off pulleys, a driving dog providing a driving connection between said let off pulleys during the resetting of said blinds, further gearing connecting said power spring to said spring motor to stress said spring motor during the resetting of said blinds, a latch normally disposed to latch said gearing, and a detent operated by one of said let off pulleys to release said latch and free said power spring and said gearing towards the end of an exposure movement of said blinds to initiate the winding of said blind springs and said spring motor by said power spring.

MAURICE EYRE PERSSE STUDDERT.

REFERENCES CITED

The following references are of record in the file of this patent:

UNITED STATES PATENTS

| Number | Name | Date |
| --- | --- | --- |
| 1,449,429 | McNaughton | Mar. 27, 1923 |
| 1,602,483 | Freeman | Oct. 12, 1926 |
| 1,631,300 | Washington | June 7, 1927 |
| 1,980,546 | Petit et al. | Nov. 13, 1934 |
| 2,025,609 | Nuchterlein | Dec. 24, 1935 |
| 2,048,655 | Hineline | July 21, 1936 |
| 2,057,198 | Marcussen | Oct. 13, 1936 |
| 2,119,200 | Campbell | May 31, 1938 |
| 2,169,001 | Mihalyi | Aug. 8, 1939 |
| 2,256,207 | Leitz et al. | Sept. 16, 1941 |
| 2,282,284 | Hineline | May 5, 1942 |
| 2,297,428 | Nuchterlein | Sept. 29, 1942 |
| 2,330,613 | Nuchterlein | Sept. 28, 1943 |
| 2,351,978 | Kuppenbender | June 20, 1944 |